Oct. 25, 1938.   J. GRAVINA   2,134,040
ANTISKID DEVICE
Filed Oct. 2, 1936
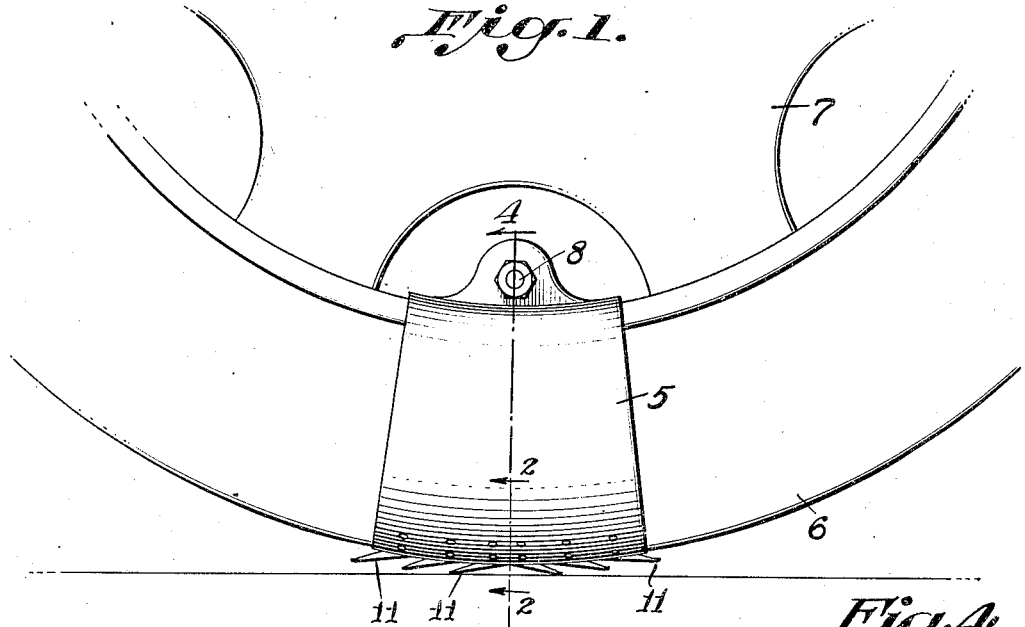
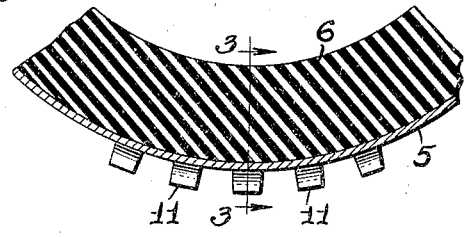
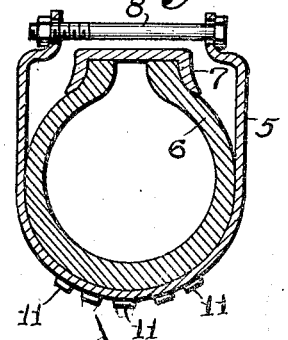
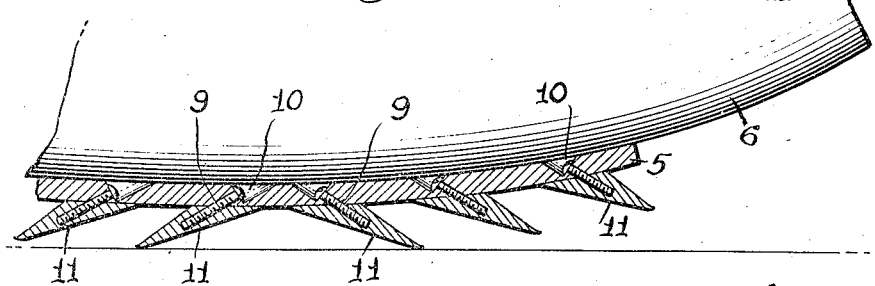
Inventor:
John Gravina.

Patented Oct. 25, 1938

2,134,040

UNITED STATES PATENT OFFICE 2,134,040

ANTISKID DEVICE

John Gravina, Bound Brook, N. J.

Application October 2, 1936, Serial No. 103,778

1 Claim. (Cl. 152—229)

The present invention relates to an improved device for preventing automobiles and the like from skidding on icy roads.

Many proposals have been made with regard to such anti-skid devices, but none of them has proved successful for preventing skidding on ice.

I have discovered that, by providing a collar including pointed teeth which are adapted to grip the road at the proper angle, not only is skidding avoided when the brakes are applied, but also better traction is secured, as is especially important on icy hills.

The nature of my invention will be made apparent in connection with the accompanying drawing, wherein Fig. 1 is a side elevation, illustrating my device attached to a vehicle wheel;

Fig. 2 is a vertical section, on enlarged scale, taken on the line 2—2 of Fig. 1;

Fig. 3 is a vertical section taken on the line 3—3 of Fig. 2; and

Fig. 4 is a vertical section taken on the line 4—4 of Fig. 1, on reduced scale.

According to the present invention, I provide a collar 5 which is adapted to surround the tire 6 of wheel 7. A suitable bolt 8, or the like, is provided for securing the collar in place. The structural details of the collar 5 constitute no part of the present invention. Those skilled in the art will have no difficulty in arranging the collar so that it can be applied to, and removed from, the wheel, as desired.

Secured to the bottom of the collar 5, for instance, by means of bolts 9, the heads of which lie in suitable recesses 10, are a series of pointed teeth 11, some of which, at one side of the middle of the collar (indicated by line 2—2, Fig. 1), extend forwardly and downwardly at an angle of about 30° to the road surface, as shown, so that when the brakes are applied these teeth are in a position to dig into the icy surface of the road. Other teeth, at the opposite side of collar, preferably extend downwardly and rearwardly, at an equal and opposite angle, so that when the wheel revolves in the counterclockwise direction (Fig. 1), these latter teeth give good traction.

While the teeth are advantageously detachably secured to the collar, for instance as shown, so that they are replaceable, it will be understood that the teeth may be attached in other manners.

What I claim is:

An anti-skid device adapted to be secured to an automobile wheel and comprising a collar having pointed teeth secured thereto and extending downwardly and forwardly to meet the road surface at a small angle thereto, said teeth lying at one side of a radial plane through the middle of the collar, and other teeth equally and oppositely inclined at the other side of said plane.

JOHN GRAVINA.